US007932856B2

(12) United States Patent
Baba

(10) Patent No.: US 7,932,856 B2
(45) Date of Patent: Apr. 26, 2011

(54) SATELLITE SIGNAL RECEPTION DEVICE, AND CONTROL METHOD FOR A SATELLITE SIGNAL RECEPTION DEVICE

(75) Inventor: Norimitsu Baba, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/708,916

(22) Filed: Feb. 19, 2010

(65) Prior Publication Data
US 2010/0214165 A1    Aug. 26, 2010

(30) Foreign Application Priority Data

Feb. 23, 2009   (JP) ................. 2009-039279

(51) Int. Cl.
G01S 19/42     (2010.01)
G01S 19/23     (2010.01)
G01S 19/34     (2010.01)
(52) U.S. Cl. ......... 342/357.25; 342/357.62; 342/357.74; 368/1
(58) Field of Classification Search ............ 342/357.25, 342/357.62, 357.63, 357.74; 368/1, 9, 10, 368/14, 20; G01S 19/23, 19/24, 19/34, 19/42
See application file for complete search history.

(56) References Cited

U.S. PATENT DOCUMENTS

| | | | |
|---|---|---|---|
| 6,212,133 B1 * | 4/2001 | McCoy et al. | 368/9 |
| 2006/0119506 A1 * | 6/2006 | Montheard et al. | 342/357.12 |
| 2007/0241959 A1 | 10/2007 | Nakagawa | |
| 2008/0074950 A1 * | 3/2008 | Rostrom | 368/10 |
| 2009/0135674 A1 * | 5/2009 | Matsuzaki | 368/14 |
| 2009/0140919 A1 | 6/2009 | Shingyoji | |

FOREIGN PATENT DOCUMENTS

| | | |
|---|---|---|
| EP | 1884842 A1 | 2/2008 |
| EP | 1887376 A1 | 2/2008 |
| JP | 2003-279637 | 10/2003 |
| JP | 2009-139128 | 6/2009 |

OTHER PUBLICATIONS

Lewandowski, W., et al., "GPS Time Transfer", proceedings of the IEEE, vol. 79, No. 7, Jul. 1991.

* cited by examiner

*Primary Examiner* — Thomas H Tarcza
*Assistant Examiner* — John B Vigushin

(57) ABSTRACT

A satellite signal reception device has a reception unit that receives a satellite signal transmitted from a positioning information satellite, and a reception control component that controls the reception unit to execute a reception process. The reception control component includes a satellite signal search component that searches for the satellite signal by means of the reception unit, a reception mode selection component that selects either a time mode or a positioning mode according to the number of satellites from which a satellite signal was captured by the satellite signal search component, a positioning process component that executes a positioning process of receiving the satellite signals and acquiring positioning information by means of the reception unit when the reception mode selection component selects the positioning mode, and a timekeeping process component that executes a timekeeping process of receiving the satellite signals and acquiring time information by means of the reception unit when the reception mode selection component selects the time mode.

9 Claims, 13 Drawing Sheets

SATELLITE SIGNAL RECEPTION DEVICE, AND CONTROL METHOD FOR A SATELLITE SIGNAL RECEPTION DEVICE

CROSS-REFERENCE TO RELATED APPLICATION(S)

Japanese Patent application No. 2009-039279 is incorporated by reference herein in its entirety.

BACKGROUND

1. Field of Invention

The present invention relates to a satellite signal reception device that receives satellite signals from positioning information satellites such as GPS satellites, and to a control method for a satellite signal reception device.

2. Description of Related Art

GPS satellites that circle the Earth on known orbits are used in the Global Positioning System (GPS), which is a system for determining one's location, and positioning devices that determine the current location of a receiver that receives signals from GPS satellites are now commonly used and available.

Each GPS satellite has an on-board atomic clock, and each GPS satellite can therefore maintain extremely accurate time information (referred to herein as the GPS time or satellite time information).

GPS receivers that acquire and display positioning information and time information by receiving signals (navigation messages) from GPS satellites have therefore been proposed. See, for example, Japanese Unexamined Patent Appl. Pub. JP-A-2003-279637.

When the number of GPS satellites from which signals can be received (referred to herein as "receivable satellites" or "captured satellites") is less than the number of satellites required for positioning (that is, 3 or more), however, the GPS receiver taught in JP-A-2003-279637 continues the satellite search until a preset time-out period (such as 2 to 3 minutes) has ended.

While the time-out time from the start to the end of reception is therefore set to approximately 2 to 3 minutes, particularly in the cold start mode in which reception begins when the GPS satellite orbit information (almanac data) is not known to the GPS receiver, battery power is consumed needlessly if reception continues when the number of receivable satellites is less than the number required for positioning.

For example, if the positioning process is executed when there is only one receivable GPS satellite, searching will continue for the 2 to 3 minute duration of the time-out period because the number of satellites required for positioning cannot be found (captured). Because power consumption by a GPS receiver is particularly high during the satellite search process, battery power continues being consumed as the satellite search and power consumption continue for the 2 to 3 minutes of the time-out period, the duration time therefore becomes shorter, and the system may shut down.

SUMMARY OF INVENTION

A satellite signal reception device and a control method for a satellite signal reception device according to the present invention can prevent needlessly continuing the satellite search process during the satellite signal reception process, and therefore enable an efficient reception process.

A first aspect of the invention is a satellite signal reception device having a reception unit that receives a satellite signal transmitted from a positioning information satellite, and a reception control component that controls the reception unit to execute a reception process. The reception control component includes a satellite signal search component that searches for the satellite signal by means of the reception unit, a reception mode selection component that selects either a time mode or a positioning mode according to the number of satellites from which a satellite signal was captured by the satellite signal search component, a positioning process component that executes a positioning process of receiving the satellite signals and acquiring positioning information by means of the reception unit when the reception mode selection component selects the positioning mode, and a timekeeping process component that executes a timekeeping process of receiving the satellite signals and acquiring time information by means of the reception unit when the reception mode selection component selects the time mode.

In this aspect of the invention the satellite signal search component executes a search process to find positioning information satellites, and selects either a positioning mode or timekeeping mode according to the number of satellites captured. By thus selecting the positioning mode only when the number of captured satellites is, for example, 3 or more, the satellite search process can be prevented from continuing until the time-out period ends because the number of positioning information satellites required for the positioning process cannot be captured.

Therefore, by selecting the reception mode according to the number of satellites captured by the satellite signal search component, the satellite signal reception process can be executed efficiently and power consumption can be reduced.

In a satellite signal reception device according to another aspect of the invention, the reception mode selection component preferably selects the time mode when the number of satellites captured by the satellite signal search component is 1 or 2, and selects the positioning mode when the number of captured satellites is 3 or more.

The time mode in which time information is acquired from a satellite signal transmitted from a positioning information satellite and the internal time information kept in the satellite signal reception device is adjusted can be processed if a signal can be received from at least one satellite. Therefore, if the reception process is executed in the time mode when the captured satellite count is 1 or 2, there is no need to search and capture more satellites, and the satellite search process can be prevented from continuing until the time-out period ends.

However, because the reception process can be executed in the positioning mode when the captured satellite count is 3 or more, there is also no need to search and capture more satellites in this situation, and the satellite search process can be prevented from continuing until the time-out period ends.

The satellite signal reception process can therefore be executed efficiently and power consumption can be reduced by selecting the reception mode according to the number of satellites captured by the satellite signal search component.

A satellite signal reception device according to another aspect of the invention also has a timekeeping component that keeps time information, and a time adjustment component that adjusts the internal time information of the timekeeping component according to time information acquired by receiving the satellite signal. When the number of satellites captured by the satellite signal search component is 1, the time adjustment component compares the acquired time information acquired from the satellite signal with the internal time information kept by the timekeeping component, and corrects the internal time information according to the acquired time information when the difference between said time information is within a preset range. When the number of satellites captured by the satellite signal search component is 2, the time adjustment component compares the two acquired time information values acquired from the satellite signals, and corrects the internal time information according to the acquired time information when said two values match.

By comparing the acquired time information that is acquired by receiving a satellite signal from a satellite with the internal time information kept by the internal timekeeping component when the captured satellite count is 1, this aspect of the invention can verify if the correct acquired time information was received. More specifically, because the internal time information is displayed by the hands or display of the timepiece and can be checked by the user, the internal time information is generally within a certain amount of error (such as 1 minute) from the actual time. Therefore, if the time information acquired by receiving the satellite signal differs from the internal time information by more than 1 minute, for example, the possibility is high that the satellite signal is weak and cannot be correctly decoded. Whether the acquired time information is correct can therefore be verified by comparison with the internal time information when the time information is acquired from only one satellite signal.

Furthermore, when the number of captured satellites is 2, the time information acquired from each of the two satellite signals can be compared with each other and determined to be correct if the values are the same, and one or both values can be determined to be wrong if the values are not the same. When time information is acquired from two satellite signals, whether the acquired time information is correct can therefore be determined by comparing the time information acquired from the two satellite signals with each other.

The internal time information can therefore be adjusted to the correct time because whether the acquired time information is correct can be verified, and the internal time information can be adjusted using acquired time information that is verified.

Further preferably in a satellite signal reception device according to another aspect of the invention, the positioning process component executes a positioning calculation based on three satellite signals when the number of satellites captured by the satellite signal search component is 3, and executes a positioning calculation based on four satellite signals when the number of satellites captured by the satellite signal search component is 4.

When three satellite signals are received, the positioning process component can calculate the current location using a two-dimensional positioning process based on the orbit information for three satellites.

When four or more satellite signals are received, the positioning process component can calculate the current location using a three-dimensional positioning process based on the orbit information for four satellites.

Therefore, because the positioning process can be executed using the signals from the captured satellites, the satellite search process does not need to continue, the satellite signal reception process can be executed efficiently, and power consumption can be reduced.

Note that three-dimensional positioning refers to calculating the current location of the satellite signal reception device using data for three dimensions, that is, latitude, longitude, and altitude. Two-dimensional positioning refers to setting the altitude to a specified value, and calculating the current location of the satellite signal reception device using data for two dimensions, that is, latitude and longitude.

Further preferably in a satellite signal reception device according to another aspect of the invention, the satellite signal search component captures satellites from which the signal level of the received satellite signal is greater than or equal to a specified value.

If only those satellites from which the satellite signal level is greater than or equal to a specified value are considered for capture, the signal level of the satellite signals transmitted from the captured satellites will be high, interference from noise can be reduced, and the correct data can be received and decoded.

Further preferably in a satellite signal reception device according to another aspect of the invention, the satellite signal search component stops the reception process of the reception unit when even one satellite cannot be captured.

When a satellite cannot be captured in the satellite search process, the satellite signal reception device may be located where radio signals from the positioning information satellites cannot be received, such as indoors where there are no windows. Therefore, by stopping the reception process when even one satellite cannot be captured, the reception process does not need to be continued needlessly, and power consumption can be reduced.

Further preferably in a satellite signal reception device according to another aspect of the invention, the satellite signal search component repeats a satellite search process that searches sequentially for each satellite a specified number of times to capture satellites.

The specified number of times the satellite search process executes may be three, for example. If the user is perambulating while wearing the satellite signal reception device, it may not be possible to capture a satellite at certain times, such as when in the shadow of a building. As a result, it may momentarily not be possible to capture a satellite if the satellite search process that searches sequentially for the satellites is executed only once, but the possibility of being able to capture a satellite can be improved if the satellite search process is executed plural times.

Furthermore, because the satellite search process is not repeated more than the specified number of times, the search process is not repeated needlessly and power consumption can be reduced when in an environment where a satellite cannot be captured.

In a satellite signal reception device according to another aspect of the invention, the satellite signal search component repeats a satellite search process that searches sequentially for each satellite for a specified time to capture satellites.

The specified time is 10 seconds, for example. If the satellite search process time is particularly short, the satellite signal reception device may be in the shadow of a building and unable to capture a satellite. However, if the search process can be executed for a specified time (such as 10 seconds) in which the satellite search process can be executed plural times, the possibility of being able to capture a satellite can be improved.

Furthermore, because the satellite search process is not repeated for longer than the specified time, the search process is not repeated needlessly and power consumption can be reduced when in an environment where a satellite cannot be captured.

A satellite signal reception device according to another aspect of the invention preferably also has a display that displays the currently selected reception mode.

If the reception mode can be displayed on a display, the user can know the reception mode in which information is currently being displayed, and user convenience can be improved.

Another aspect of the invention is a control method for a satellite signal reception device that has a reception unit that receives a satellite signal transmitted from a positioning information satellite, the control method including: a satellite signal search step that searches for the satellite signal by means of the reception unit; a reception mode selection step that selects either a time mode or a positioning mode according to the number of satellites from which a satellite signal was captured in the satellite signal search step; a positioning process step that that executes a positioning process of receiving the satellite signals and acquiring positioning information by means of the reception unit when the reception mode selection step selects the positioning mode, and a timekeeping process step that executes a timekeeping process of receiving the satellite signals and acquiring time information by means of the reception unit when the reception mode selection step selects the time mode.

The control method of a satellite signal reception device according to the invention can achieve the same operational effect as the satellite signal reception device described above.

DESCRIPTION OF THE PREFERRED EMBODIMENTS

Preferred embodiments of the present invention are described below with reference to the accompanying figures.

Note that the embodiments described below are specific examples of preferred embodiments of the invention and therefore include some technically desirable limitations, but the scope of the invention is not limited thereto unless it is specifically stated below that the invention is limited in some way.

GPS system

Summary

Figure 1:
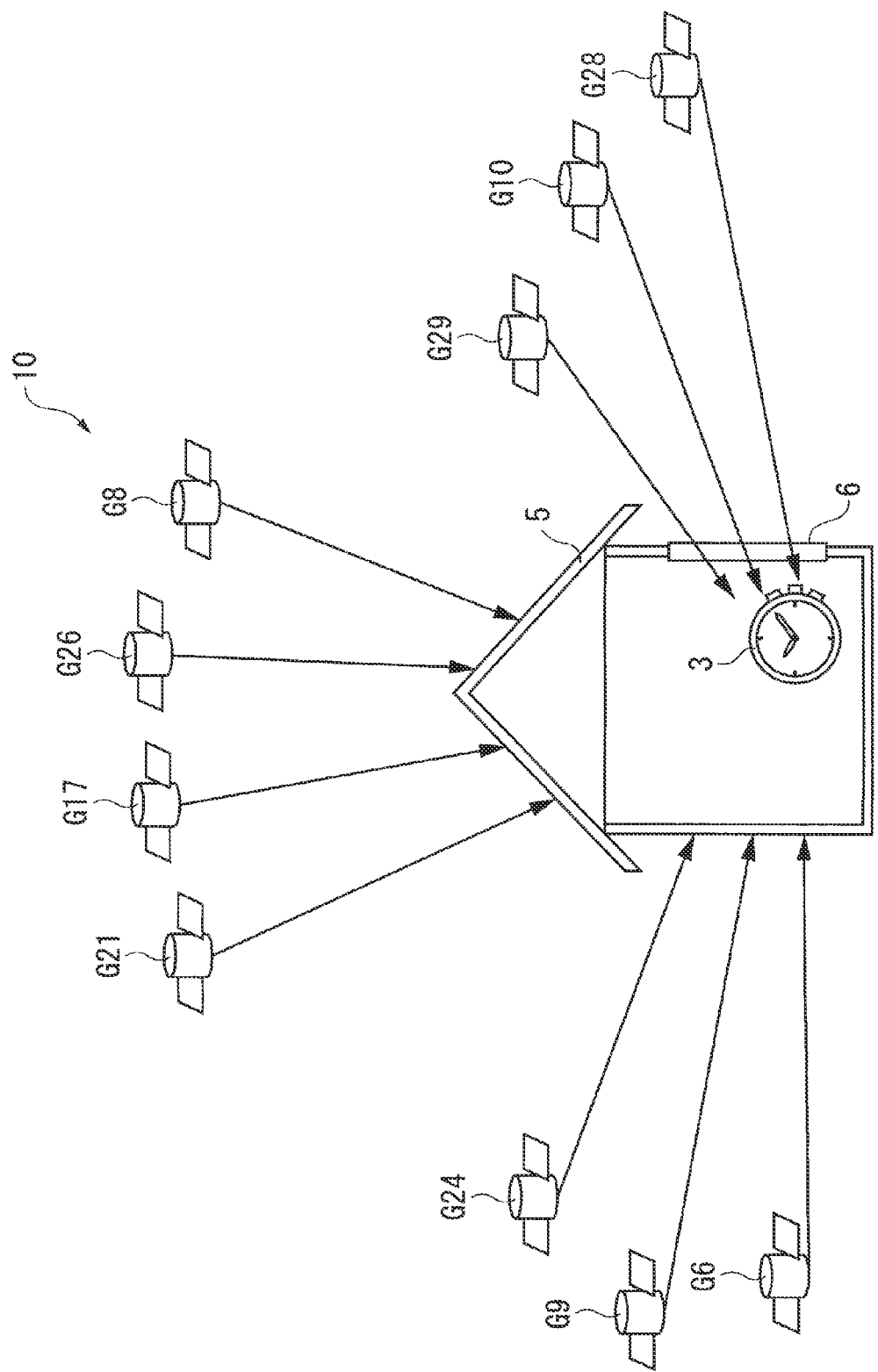
FIG. 1 schematically describes the GPS system.

FIG. 1 schematically describes a GPS system, which is a microwave communication system.

GPS satellites 10 orbit the Earth on specific known orbits and transmit navigation messages superposed to a 1.57542 GHz microwave carrier (L1 signal) to Earth. Note that a GPS satellite 10 is an example of a positioning information satellite in a preferred embodiment of the invention, and the 1.57542 GHz microwave carrier signal with a superposed navigation message (referred to below as the "satellite signal") is an example of a satellite signal in a preferred embodiment of the invention.

There are currently approximately 30 GPS satellites 10 in orbit, and in order to identify the GPS satellite 10 from which a satellite signal was transmitted, each GPS satellite 10 superposes a unique 1023 chip (1 ms period) pattern called a Coarse/Acquisition Code (CA code) to the satellite signal. The C/A code is an apparently random pattern in which each chip is either +1 or −1. The C/A code superposed to the satellite signal can therefore be detected by correlating the satellite signal with the pattern of each C/A code.

Each GPS satellite 10 has an atomic clock on board, and the satellite signal carries the extremely accurate time information (called the "GPS time information" below) kept by the atomic clock. The miniscule time difference of the atomic clock on board each GPS satellite 10 is measured by a terrestrial control segment, and a time correction parameter for correcting the time difference is also contained in the satellite signal. A satellite signal reception device ("GPS receiver" below) built in to a GPS wristwatch 3 can therefore receive the satellite signal transmitted from one GPS satellite 10 and adjust the internally kept time to the correct time by using the GPS time information and time correction parameter contained in the received signal.

Orbit information describing the location of the GPS satellite 10 on its orbit is also contained in the satellite signal. The GPS receiver can perform a positioning calculation using the GPS time information and the orbit information. This positioning calculation assumes that there is a certain amount of error in the internal time kept by the GPS receiver. More specifically, in addition to the x, y, and z parameters for identifying the three-dimensional position of the GPS receiver, the time difference is also an unknown value. As a result, a GPS receiver generally receives satellite signals transmitted from four or more GPS satellites, and performs the positioning calculation using the GPS time information and orbit information contained in the received signals.

Because the GPS satellites 10 are orbiting satellites, the satellite signals are microwave signals with a strong rectilinear propagation characteristic, and the satellite signals cannot be received from a GPS satellite 10 that is hidden below the horizon, the number of GPS satellites 10 that can be captured at any particular point on Earth at any particular time varies.

Figure 2:
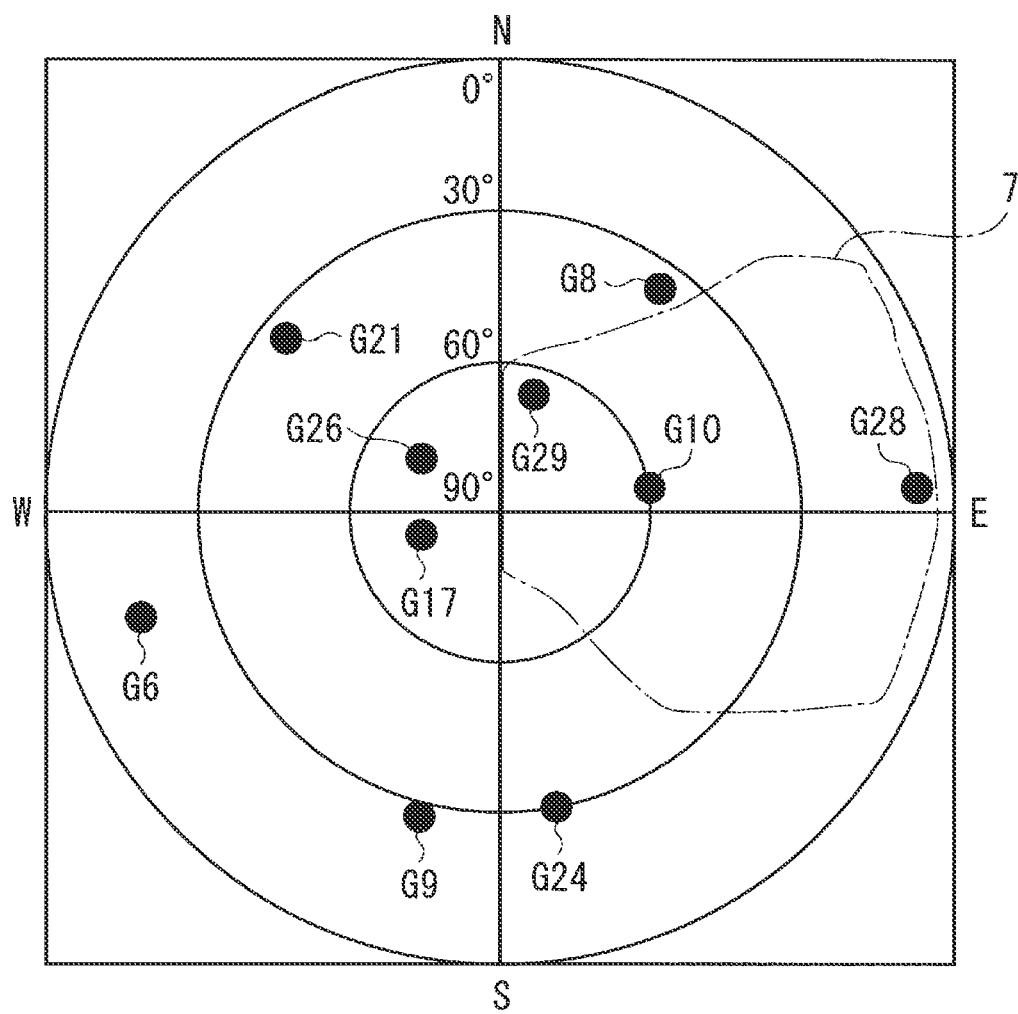
FIG. 2 shows an example of the GPS satellite positions.

FIG. 2 is a sky plot showing the locations of the GPS satellites 10 at a particular time and place. The directions north (N), south (S), east (E), and west (W) are shown at the top, bottom, right, and left sides of FIG. 2. The outside circle in FIG. 2 denotes the horizon (at a 0° inclination angle), and the inside circles denote inclination angles of 30° and 60°, respectively, from outside to inside. The center point of the circles therefore denotes an inclination angle of 90°, that is, the zenith.

In FIG. 1 and FIG. 2 the satellite numbers of the GPS satellites 10 are indicated by G and a numeric index. As shown in FIG. 1, the GPS wristwatch 3 is located inside a building 5. The building 5 has a window 6 facing east. As a result, the GPS wristwatch 3 can only receive satellite signals from the GPS satellites 10 through the window 6. In FIG. 1 and FIG. 2, therefore, the GPS wristwatch 3 can only receive satellite signals from the three GPS satellites 10 labelled G29, G10, and G28, and cannot receive signals from the other GPS satellites 10 because they are blocked by the roof and walls of the building 5. The range enclosed by the dot-dash line in FIG. 2 indicates the positions (direction and inclination angle) of the GPS satellites 10 from which signals can be received by the GPS wristwatch 3 located inside the building 5, and the GPS wristwatch 3 can capture and receive signals from the GPS satellites 10 in this range.

Figure 3:
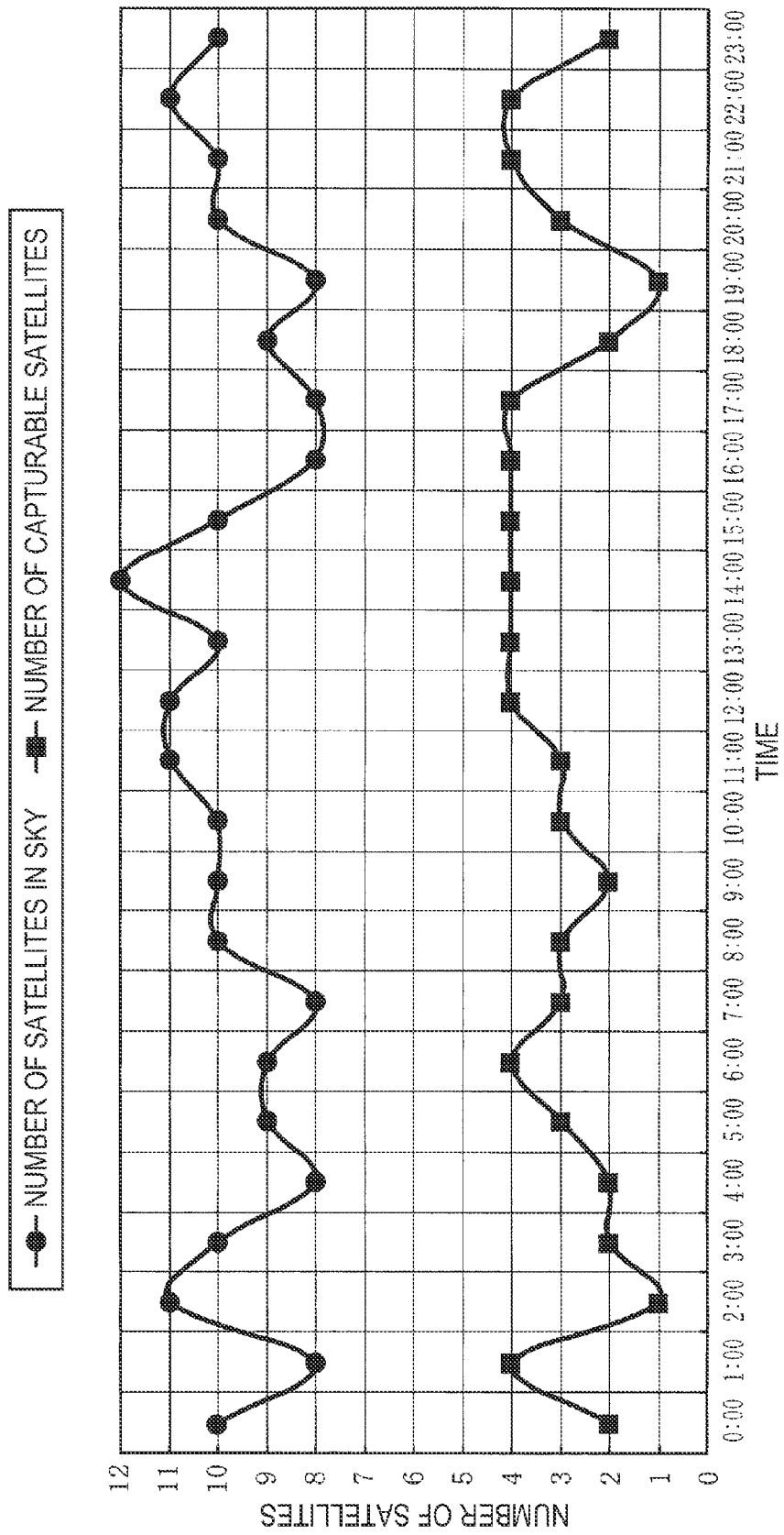
FIG. 3 shows the change in the number of satellites in the sky and the number of receivable satellites.

FIG. 3 plots the number of GPS satellites 10 in the sky, and the number of GPS satellites 10 that can be received by the GPS wristwatch 3 inside the building 5, that is, the number of GPS satellites 10 in the range denoted by the dot-dash line in FIG. 2, each hour.

As will be known from FIG. 3, the number of GPS satellites 10 from which signals can be received by the GPS wristwatch 3 varies over time and ranges from a maximum of 4 to a minimum of 1.

Navigation Message

Figure 4A:
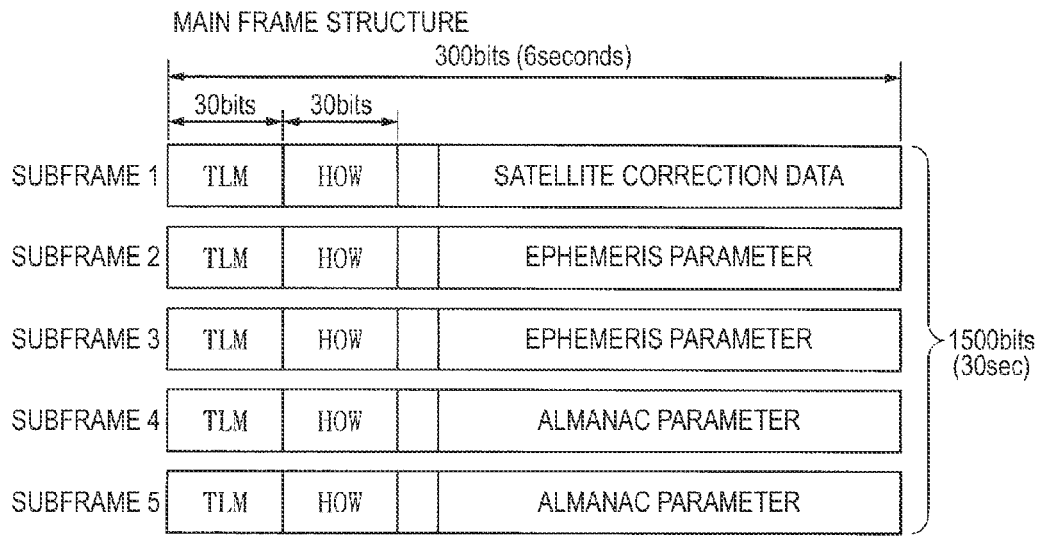
FIGS. 4A-4C illustrate the structure of the navigation message.
Figure 4B:
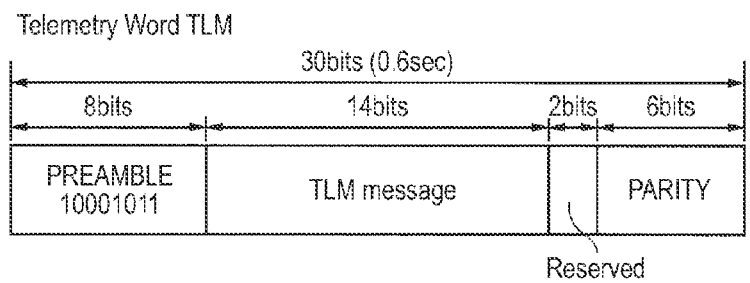
Figure 4C:
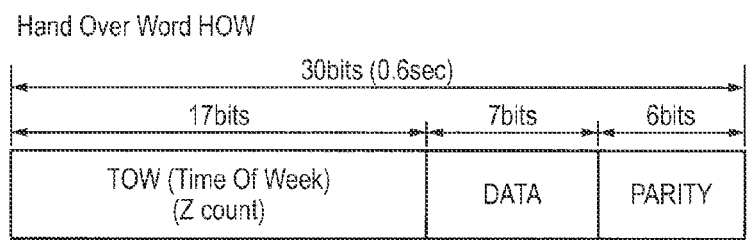

FIG. 4A to FIG. 4C describe the structure of the navigation message.

As shown in FIG. 4A, the navigation message is composed of data organized in a single main frame containing a total 1500 bits. The main frame is divided into five subframes of 300 bits each. The data in one subframe is transmitted in 6 seconds from each GPS satellite 10. It therefore requires 30 seconds to transmit the data in one main frame from each GPS satellite 10.

Subframe 1 contains satellite correction data such as the week number. The week number identifies the week to which the current GPS time information belongs. The GPS time starts at 00:00:00 on Jan. 6, 1980, and the number of the week that started that day is week number 0. The week number is updated every week.

Subframes 2 and 3 contain ephemeris data, that is, detailed orbit information for each GPS satellite 10. Subframes 4 and 5 contain almanac data (general orbit information for all GPS satellites 10 in the constellation).

Each of subframes 1 to 5 starts with a telemetry (TLM) word containing 30 bits of telemetry (TLM) data, followed by a HOW word containing 30 bits of HOW (handover word) data.

Therefore, while the TLM words and HOW words are transmitted at 6-second intervals from the GPS satellite 10, the week number data and other satellite correction data, ephemeris data, and almanac data are transmitted at 30-second intervals.

As shown in FIG. 4B, the TLM word contains preamble data, a TLM message, reserved bits, and parity data.

As shown in FIG. 4C, the HOW word contains GPS time information called the TOW or Time of Week (also called the Z count). The Z count denotes in seconds the time passed since 00:00 of Sunday each week, and is reset to 0 at 00:00 of Sunday each week. More specifically, the Z count denotes the time passed from the beginning of each week in seconds. The Z count denotes the GPS time at which the first bit of the next subframe data is transmitted. For example, the Z count transmitted in subframe 1 denotes the GPS time that the first bit in subframe 2 is transmitted.

The HOW word also contains 3 bits of data denoting the subframe ID (also called the ID code). More specifically, the HOW words of subframes 1 to 5 shown in FIG. 4A contain the ID codes 001, 010, 011, 100, and 101, respectively.

The GPS receiver can get the GPS time information by acquiring the week number value contained in subframe 1 and the HOW words (Z count data) contained in subframes 1 to 5. However, if the GPS receiver has previously acquired the week number and internally counts the time passed from when the week number value was acquired, the current week number value of the GPS satellite can be obtained without acquiring the week number from the satellite signal. The GPS receiver can therefore know the current time, except for the date, once the Z count is acquired. The GPS receiver therefore normally acquires only the Z count as the time information.

Note that the TLM word, HOW word (Z count), satellite correction data, ephemeris, and almanac parameters are examples of satellite information in the invention.

A wristwatch 3 with a GPS device having this type of GPS receiver (referred to herein as a "GPS wristwatch 3") is described next.

2. GPS Wristwatch

Circuit Configuration of a GPS Wristwatch

Figure 5:
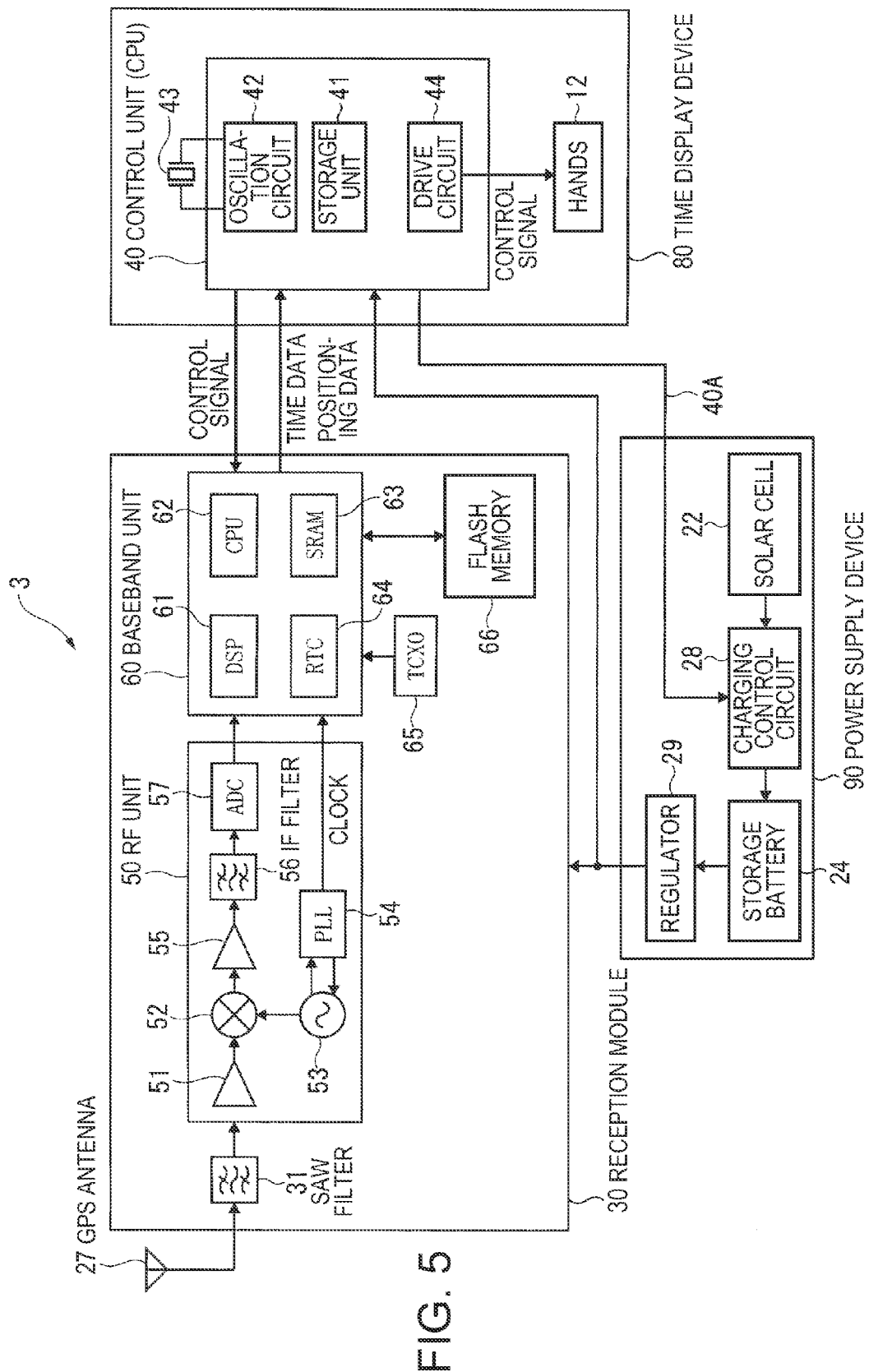
FIG. 5 shows the circuit configuration of a GPS wristwatch according to the first embodiment of the invention.

FIG. 5 describes the circuit configuration of a GPS wristwatch 3 according to a first embodiment of the invention.

The GPS wristwatch 3 is set to either a mode (referred to below as the "time mode") for receiving a satellite signal from at least one GPS satellite 10 and adjusting the internal time information, or a mode (referred to below as the "positioning mode") for receiving satellite signals from a plurality of GPS satellites 10, calculating the current position to determine the current location, and correcting the internal time information based on the time difference identified from the current position and the GPS time information. The GPS wristwatch 3 thus executes either a time adjustment process in the time mode or a time adjustment process (time difference correction process) in the positioning mode.

The GPS wristwatch 3 has a reception module 30, which is a reception unit, a GPS antenna 27, a time display device 80, and a power supply device 90.

Reception Module Configuration

The GPS antenna 27 is connected to the reception module 30. The GPS antenna 27 is an antenna that receives satellite signals from a plurality of GPS satellites 10.

The reception module 30 includes a SAW (surface acoustic wave) filter 31, RF (radio frequency) unit 50, and baseband unit 60. The SAW filter 31 executes a process that extracts a satellite signal from the signal received by the GPS antenna 27. More particularly, the SAW filter 31 is rendered as a bandpass filter that passes signals in the 1.5 GHz band.

As described below, the RF unit 50 and baseband unit 60 execute a process that acquires satellite information including orbit information and GPS time information contained in the navigation message from the 1.5 GHz satellite signal extracted by the SAW filter 31.

The RF unit 50 includes a low noise amplifier (LNA) 51, a mixer 52, a VCO (voltage controlled oscillator) 53, a PLL (phase locked loop) circuit 54, an IF (intermediate frequency) amplifier 55, and IF filter 56, and an A/D converter 57.

The satellite signal extracted by the SAW filter 31 is amplified by the LNA 51. The satellite signal amplified by the LNA 51 is mixed by the mixer 52 with a clock signal output from the VCO 53, and is down-converted to a signal in the intermediate frequency band. The PLL circuit 54 phase compares a reference clock signal and a clock signal obtained by frequency dividing the output clock signal of the VCO 53, and synchronizes the output clock signal of the VCO 53 to the reference clock signal. As a result, the VCO 53 can output a stable clock signal with the frequency precision of the reference clock signal. Note that a frequency of several megahertz can be selected as the intermediate frequency.

The signal mixed by the mixer 52 is then amplified by the IF amplifier 55. This mixing step of the mixer 52 generates a signal in the IF band and a high frequency signal of several gigahertz. As a result, the IF amplifier 55 amplifies the IF band signal and the high frequency signal of several gigahertz. The IF filter 56 passes the IF band signal and removes this high frequency signal of several gigahertz (or more particularly attenuates the signal to a specific level or less). The IF band signal passed by the IF filter 56 is then converted to a digital signal by the A/D converter 57.

The baseband unit 60 includes a DSP (digital signal processor) 61, CPU (central processing unit) 62, SRAM (static random access memory) 63, and RTC (real-time clock) 64. A TXCO (temperature-compensated crystal oscillator) 65 and flash memory 66 are also connected to baseband unit 60.

The TXCO 65 generates a reference clock signal of a substantially constant frequency irrespective of temperature.

Time difference information, for example, is stored in the flash memory 66. This time difference information is information defining the time difference in each of the plural regions into which geographical information is divided.

When the time mode or positioning mode is set, the baseband unit 60 demodulates the baseband signal from the digital signal (IF band signal) output by the A/D converter 57 of the RF unit 50.

In addition, when the time mode or positioning mode is set, the baseband unit 60 executes a process to generate a local code of the same pattern as each C/A code, and correlate the local code with the C/A code contained in the baseband signal, in the satellite signal search process described below. The baseband unit 60 also adjusts the output timing of the local code to achieve the peak correlation value to each local code, and when the correlation value equals or exceeds a threshold value, determines successful synchronization with the GPS satellite 10 matching that local code (that is, determines a lock on that the GPS satellite 10).

Note that the GPS system uses a CDMA (code division multiple access) system enabling all GPS satellites 10 to transmit satellite signals at the same frequency using different C/A codes. Therefore, a GPS satellite 10 that can be captured can be found by evaluating the C/A code contained in the received satellite signal.

The baseband unit 60 mixes a local code having the same pattern as the C/A code of the captured GPS satellite 10 with the baseband signal, demodulates the navigation message, and acquires and stores satellite information, including the orbit information and GPS time information, that is contained in the navigation message to SRAM 63.

The orbit information and GPS time information contained in the navigation message are examples of the position information and time information in this invention, and the reception module 30 functions as a reception unit in this invention.

Operation of the baseband unit 60 is synchronized to the reference clock signal output by the TXCO 65. The RTC 64 generates timing signals for processing the satellite signals. The RTC 64 counts up at the reference clock signal output from the TXCO 65.

Configuration of the Time Display Device

The time display device 80 includes a control unit (CPU) 40 and a crystal oscillator 43.

The control unit 40 includes a storage unit 41, oscillation circuit 42, and drive circuit 44, and controls various operations.

The control unit 40 controls the reception module 30. More specifically, the control unit 40 sends control signals to the reception module 30 and controls the reception operation of the reception module 30.

The control unit 40 also controls driving the hands 12 by means of an internal drive circuit 44.

The internal time information is stored in the storage unit 41. The internal time information is information about the time kept internally by the GPS wristwatch 3. The internal time information is updated by the reference clock signal generated by the crystal oscillator 43 and oscillation circuit 42. The internal time information can therefore be updated and moving the hands 12 can continue even when power supply to the reception module 30 has stopped.

When the time mode is set, the control unit 40 controls operation of the reception module 30, corrects the internal time information based on the GPS time information and saves the corrected time in the storage unit 41. More specifically, the internal time information is adjusted to the UTC (Coordinated Universal Time), which is acquired by adding the UTC offset (the cumulative leap seconds, which is the difference between the GPS time and UTC and is currently −14 seconds) to the acquired GPS time information.

When the positioning mode is set, the control unit 40 controls operation of the reception module 30, corrects the internal time information based on the GPS time information, the UTC offset parameter, and the time difference data acquired from the current location, and stores the corrected time in the storage unit 41.

Configuration of the Power Supply Device

The power supply device 90 includes a charging control circuit 28, storage battery 24, regulator 29, and solar cell 22 included in the time display device 80.

The storage battery 24 supplies drive power to the reception module 30 and time display device 80, for example, through the regulator 29. Current produced by photovoltaic generation by the solar cell 22 is supplied through the charging control circuit 28 to the storage battery 24, and the storage battery 24 is thereby charged.

The charging control circuit 28 is connected between an electrode of the solar cell 22 and an electrode of the storage battery 24, and electrically connects or disconnects the electrode of the solar cell 22 and the electrode of the storage battery 24 based on the control signal 40A.

Construction of a GPS Wristwatch

Figure 6:
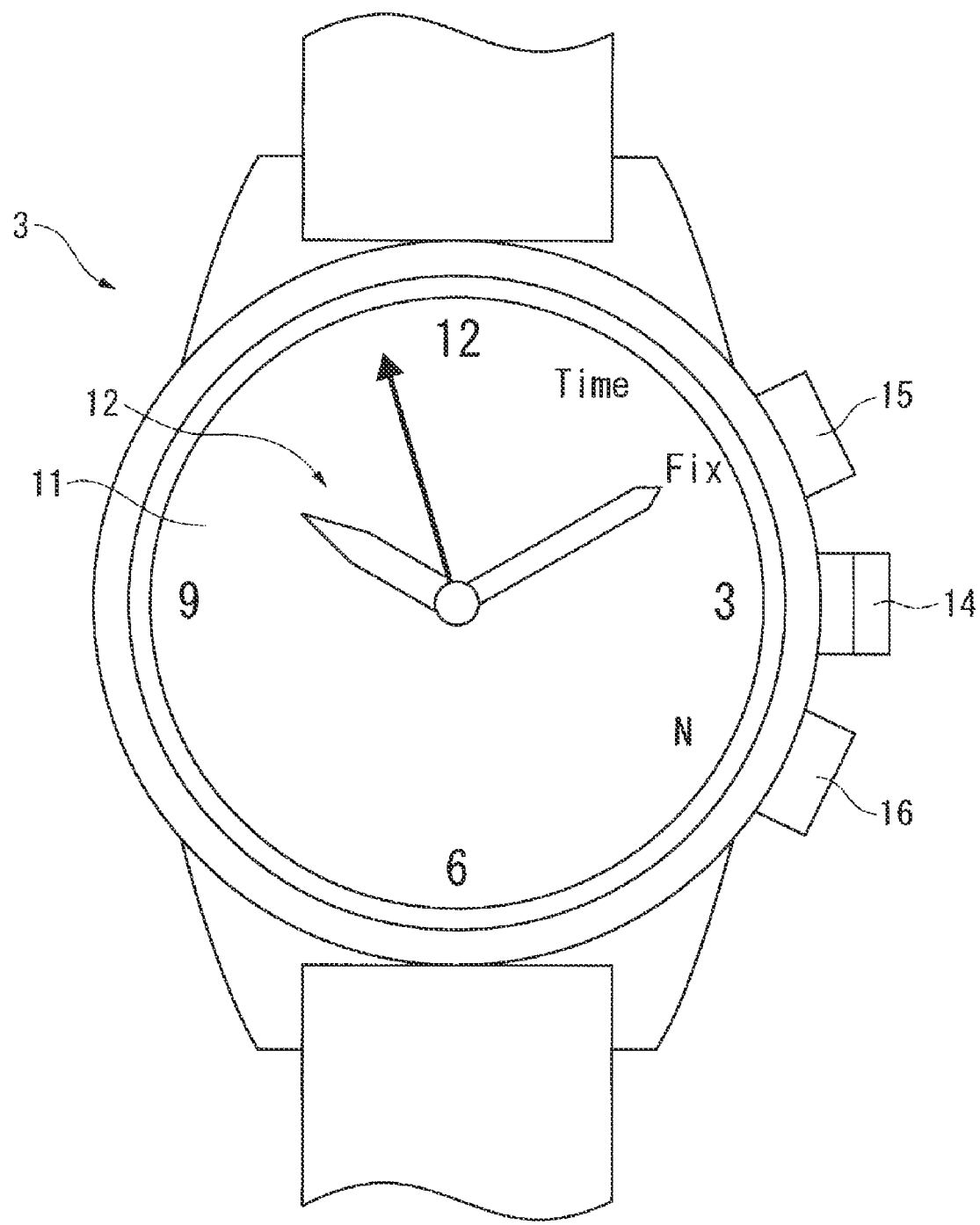
FIG. 6 is a plan view of a GPS wristwatch according to the first embodiment of the invention.
Figure 7:
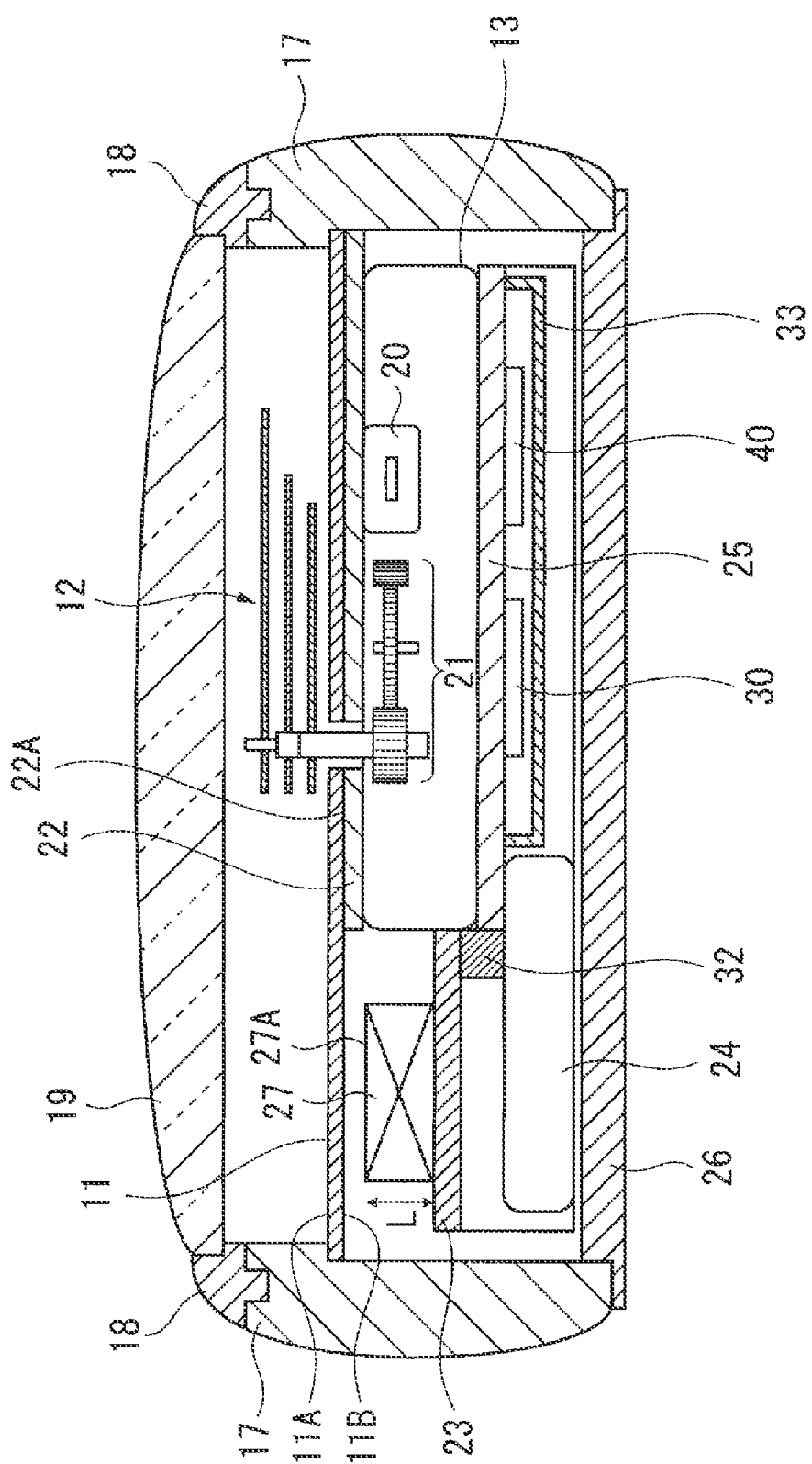
FIG. 7 is a schematic section view of the GPS wristwatch according to the first embodiment of the invention.

FIG. 6 and FIG. 7 are figures describing the configuration of a GPS wristwatch 3 according to a first embodiment of the invention. FIG. 6 is a schematic plan view of the GPS wristwatch 3, and FIG. 7 is a schematic section view of the GPS wristwatch 3 shown in FIG. 6.

As shown in FIG. 6, the GPS wristwatch 3 has a dial 11 and hands 12. The hands 12 include a second hand, minute hand, and hour hand, and are driven through a wheel train by means of a stepping motor.

The GPS wristwatch 3 is configured to execute the reception process and reception result display process by manually operating the crown 14, button 15 (A button), or button 16 (B button), for example.

For example, if button 15 (A button) is pressed for several seconds (such as 3 seconds) or longer, the GPS wristwatch 3 executes the reception process. Whether the time mode or the positioning mode is enabled at this time is automatically selected by the control unit 40 according to the result of the satellite search and the number of satellites captured.

If button 15 (A button) is pressed for a short time, the GPS wristwatch 3 displays the reception result during the last reception mode by means of the dial 11 and hands 12.

For example, if reception was successful in the time mode, the second hand moves to the "Time" position (that is, pointing to the 1 (the 5-second position) on the dial), and if reception was successful in the positioning mode, the second hand moves to the "Fix" position (that is, pointing to the 2 (the 10-second position) on the dial). If reception failed, the second hand moves to the "N" position (that is, pointing to the 4 (the 20-second position)).

As shown in FIG. 7, the GPS wristwatch 3 has an outside case 17 that is made of stainless steel, titanium, or other metal.

The outside case 17 is basically cylindrically shaped, and a crystal 19 is attached to the opening on the face side of the outside case 17 by an intervening bezel 18. The bezel 18 is made from a non-metallic material such as ceramic in order to improve satellite signal reception performance. A back cover 26 is attached to the opening on the back side of the outside case 17.

Inside the outside case 17 are disposed a movement 13, a solar cell 22, a GPS antenna 27, and a storage battery 24.

The movement 13 includes a stepping motor and wheel train 21. The stepping motor has a motor coil 20, a stator and a rotor, and drives the hands 12 through an intervening wheel train.

A circuit board 25 is disposed on the back cover side of the movement 13, and the circuit board 25 is connected through a connector to an antenna circuit board 23 and the storage battery 24.

The reception module 30 including a reception circuit for processing satellite signals received through the GPS antenna 27, and the control unit (CPU) 40 that controls driving the stepping motor, for example, are mounted on the circuit board 25. The reception module 30 and control unit (CPU) 40 are covered by a shield plate 33, and are driven by power supplied from the storage battery 24.

The battery 24 is a lithium-ion battery or other type of rechargeable storage battery, and is rendered to store power generated by the solar cell 22. More particularly, the solar cell 22 produces electrical power by photovoltaic generation and the storage battery 24 is charged by electrically connecting an electrode of the solar cell 22 and an electrode of the storage battery 24. Note that this embodiment of the invention uses a lithium ion battery or other secondary battery as the storage battery 24, but a capacitor or other type of electrical storage device may be used as the storage battery 24.

The solar cell 22 is disposed so that the light-receiving side 22A (the side on top in FIG. 7) faces part of the back side 11B (that is, the surface on the opposite side as the front (time display surface) 11A) of the dial 11, and produces electrical power by photovoltaic generation using the light that passes through the crystal 19 and the dial 11.

Because the dial 11 can be seen from the outside, a low transmittance material is preferably used to improve the appearance while passing as much light as possible. The dial 11 is therefore preferably made of a non-metallic material such as plastic or glass that passes light.

The GPS antenna 27 mounted on the antenna circuit board 23 is an antenna for receiving satellite signals from a plurality of GPS satellites 10, and may be a patch antenna, helical antenna, chip antenna, or inverted F-type antenna, for example. Note that because the 1.57542-GHz microwave signal transmitted from the GPS satellite 10 is a circularly polarized wave, the GPS antenna 27 is preferably rendered using a patch antenna that can receive circularly polarized waves.

In order to improve the appearance and wearability of the GPS wristwatch 3, this embodiment of the invention renders the GPS antenna 27 on the back side 11B of the dial 11. As a result, the dial 11 is preferably made from a material that passes microwave signals in the 1.5 GHz band, such as plastic, glass, or other non-metallic material with low electrical conductivity and transmittance.

The GPS antenna 27 receives microwave signals (satellite signals) from the entire top and side surface areas. Therefore, so that metal members in the solar cell 22 do not block the microwaves, the solar cell 22 is not disposed between the back side 11B of the dial 11 and the reception surface 27a of the GPS antenna 27 (the top surface as seen in FIG. 7).

However, the GPS antenna 27 and the metal members inside the solar cell 22 become electrically coupled when the distance between the GPS antenna 27 and the solar cell 22 is short, and loss occurs. The shorter the distance between the GPS antenna 27 and solar cell 22, the greater the radiation pattern of the GPS antenna 27 is blocked by the solar cell 22, and the smaller the radiation pattern of the GPS antenna 27 becomes. In addition, because the transparent electrode and metal electrode that are components of the solar cell 22 are configured using metal members, electrical conductivity is high, and the transparent electrode and metal electrode in the solar cell are major contributors to degraded reception performance. The distance between the GPS antenna 27 and the transparent electrode and metal electrode of the solar cell 22 is therefore controlled to be greater than or equal to a specified value so that reception performance does not deteriorate.

The GPS antenna 27 is also disposed so that the distance to other metal members is greater than or equal to a specified multiple in order to prevent electrical coupling with metal members other than the solar cell 22 and the resulting loss, to prevent other metallic members from blocking or reducing the radiation pattern of the GPS antenna 27, and to prevent a drop in the reception performance of the GPS antenna 27. For example, if the case 17 and movement 13 are composed of metallic members, the GPS antenna 27 is disposed so that the distance to the case 17 and the distance to the movement 13 are both greater than or equal to a specified value.

Reception Process

The reception process of the GPS wristwatch 3 according to this first embodiment of the invention is described next.

Figure 8:
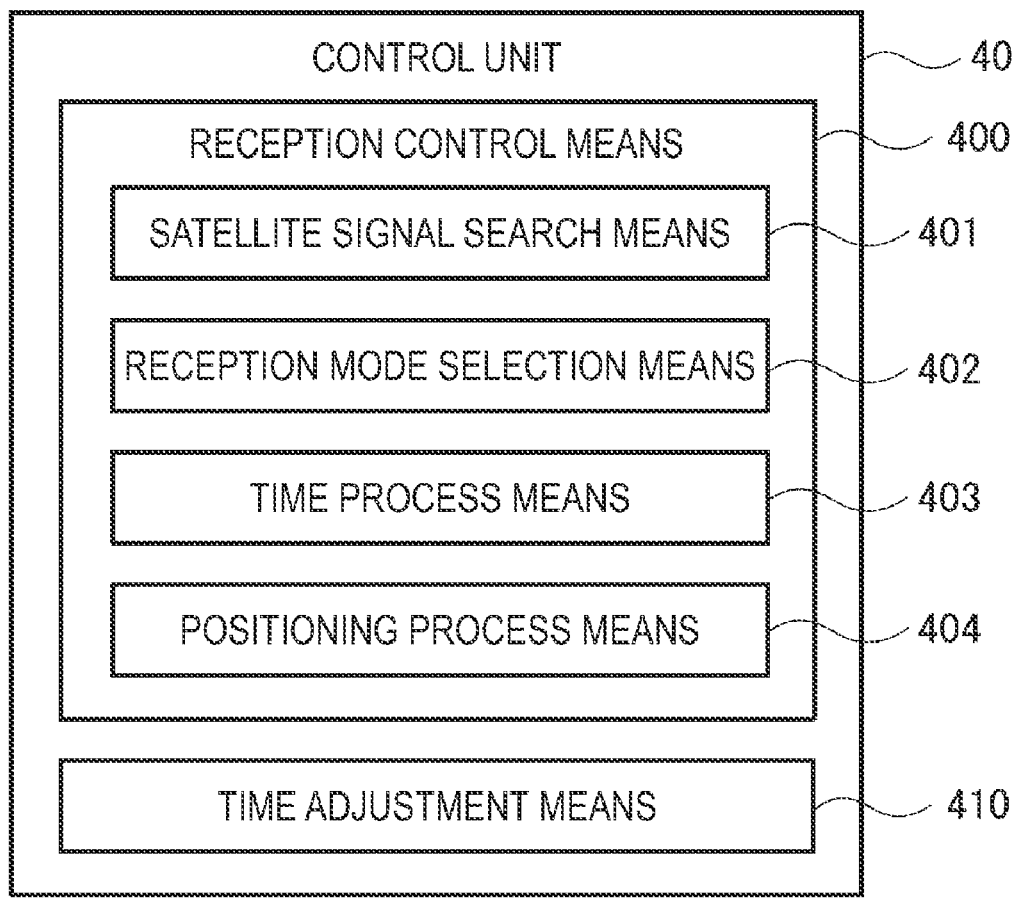
FIG. 8 is a block diagram showing the configuration of the control unit in the first embodiment of the invention.

The control unit (CPU) 40 can be rendered by dedicated devices that control these various processes, or by a device that executes these various control processes by executing a control program stored in the storage unit 41. More specifically, as shown in FIG. 8, the control unit (CPU) 40 functions as a reception control component 400, and the reception control component 400 includes a satellite signal search component 401, a reception mode selection component 402, a timekeeping process component 403, and a positioning process component 404.

Figure 9:
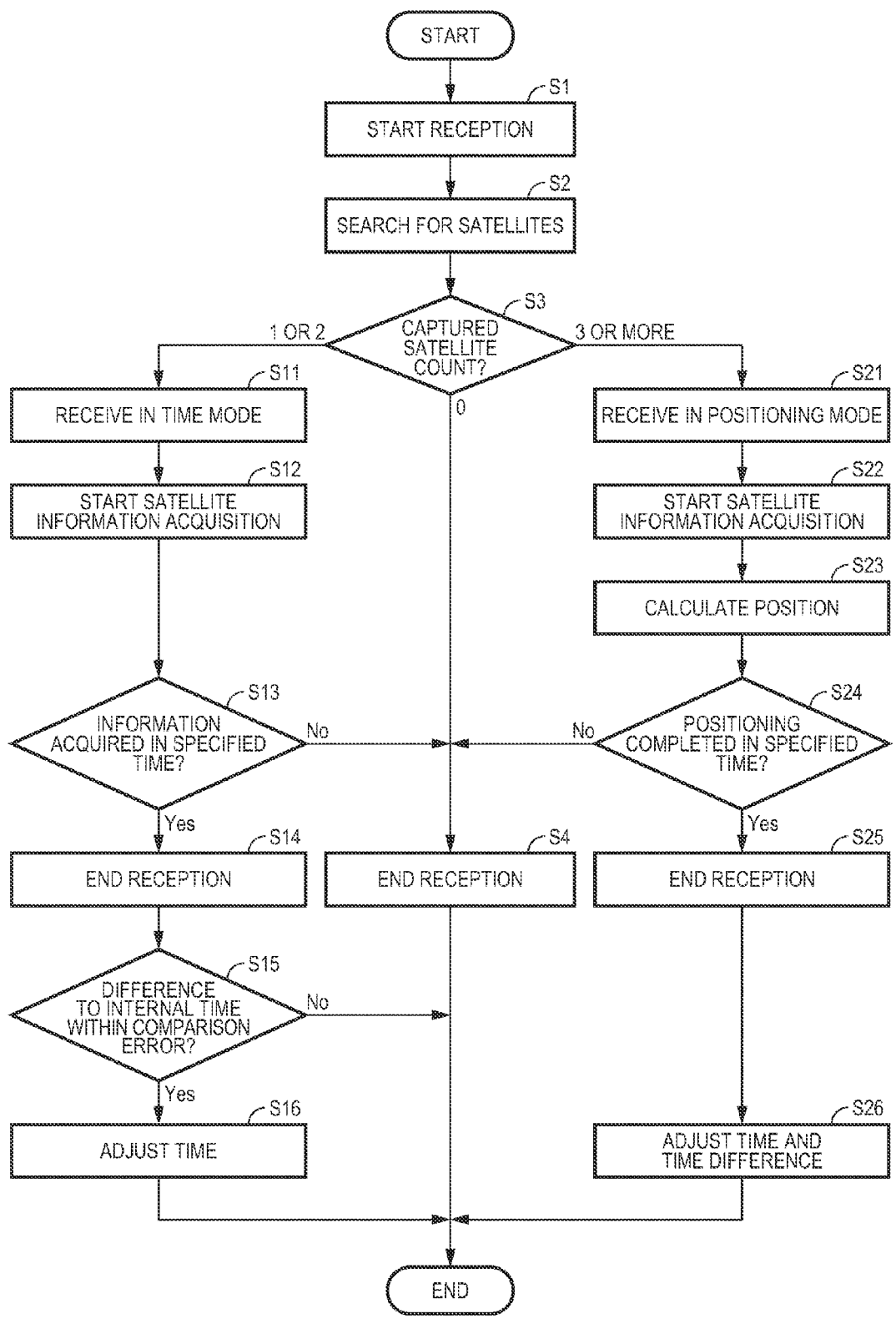
FIG. 9 is a flow chart showing the reception process in the first embodiment of the invention.

The reception process executed by the reception control component 400 is described next with reference to FIG. 9.

When a set reception time comes, or when the button 15 (A button) is depressed for a preset time to manually force reception, the control unit 40 of the GPS wristwatch 3 controls the reception module 30 by means of the reception control component 400 to execute the reception process. More specifically, the reception control component 400 activates the reception module 30, and the reception module 30 starts receiving satellite signals sent from the GPS satellites 10 (step 1). Note that "step" is denoted by the prefix "S" below.

Next, the reception control component 400 starts the satellite signal search step (satellite search step) by means of the satellite signal search component 401 (S2). In the satellite search step the reception module 30 runs a process to search for GPS satellites 10 that can be captured.

More specifically, if there are, for example, thirty GPS satellites 10, the baseband unit 60 generates a local code with the same C/A code as the satellite number SV while changing the satellite number SV from 1 to 30. The baseband unit 60 then calculates the correlation between the local code and the C/A code contained in the baseband signal. If the C/A code contained in the baseband signal and the local code are the same, the correlation value will peak at a specific time, but if they are different codes, the correlation value will not have a peak and will always be substantially 0.

The baseband unit 60 adjusts the output timing of the local code so that the correlation value of the local code and the C/A code in the baseband signal goes to the peak, and determines that the GPS satellite 10 of the satellite number SV was captured if the correlation value is greater than or equal to the set threshold value. Only the GPS satellites 10 from which the satellite signal exceeds a preset signal level are captured.

The baseband unit 60 then saves the information (such as the satellite number) of the captured GPS satellite 10 in SRAM 63.

Note that the code length of the local code is 1 ms, and a search for all of the GPS satellites 10 can be completed in approximately 2 seconds even when the search process looks for approximately 30 GPS satellites 10 by adjusting the output timing of the local code.

In this embodiment of the invention the process searching for approximately 30 GPS satellites 10 is repeated a specific number of times, such as 3 times, in the satellite search step S2.

The satellite signal search component 401 then determines whether the number of satellites captured in the satellite search step (the "captured satellite count") is 0, 1 or 2, or 3 or more (S3).

If the captured satellite count is 0, the reception control component 400 unconditionally terminates the reception operation of the reception module 30 (S4). If the GPS wristwatch 3 is located where reception is not possible, such as indoors where there is no window, a GPS satellite 10 cannot be captured even if the satellite search step continues. Wasteful power consumption can therefore be prevented in this situation by the reception control component 400 unconditionally ending the satellite search step.

If the captured satellite count is 1 or 2, the reception mode selection component 402 selects the time mode and the timekeeping process component 403 of the reception control component 400 executes the reception process in the time mode (S11).

Time Mode (Time Adjustment Process)

When the time mode is selected, the timekeeping process component 403 starts acquiring the satellite information (particularly the GPS time information) of the captured GPS satellite 10 (step S12).

More specifically, the baseband unit 60 executes a process of demodulating the navigation message from the captured GPS satellite 10 and acquiring the Z count data from three subframes. The baseband unit 60 then stores the acquired GPS time information in SRAM 63. If the Z counts acquired from the three subframes are all correct, the timekeeping process component 403 ends satellite information acquisition.

The timekeeping process component 403 then determines if satellite information was acquired from one or more GPS satellites 10 within the specified time (within the time-out time) (S13). If the time information could not be acquired within the time-out period (S13 returns No), the timekeeping process component 403 ends reception (S4). A time-out may occur, for example, if the satellite information from one or more GPS satellites 10 cannot be correctly demodulated because the reception level of the satellite signals from the GPS satellites 10 is low.

However, if acquisition of satellite information from one or more GPS satellites 10 is completed within the time-out period (before operation times out) (S13 returns Yes), the timekeeping process component 403 reads the satellite information (GPS time information) for at least one GPS satellite 10 from SRAM 63 and ends the reception operation of the reception module 30 (S14).

Figure 10:
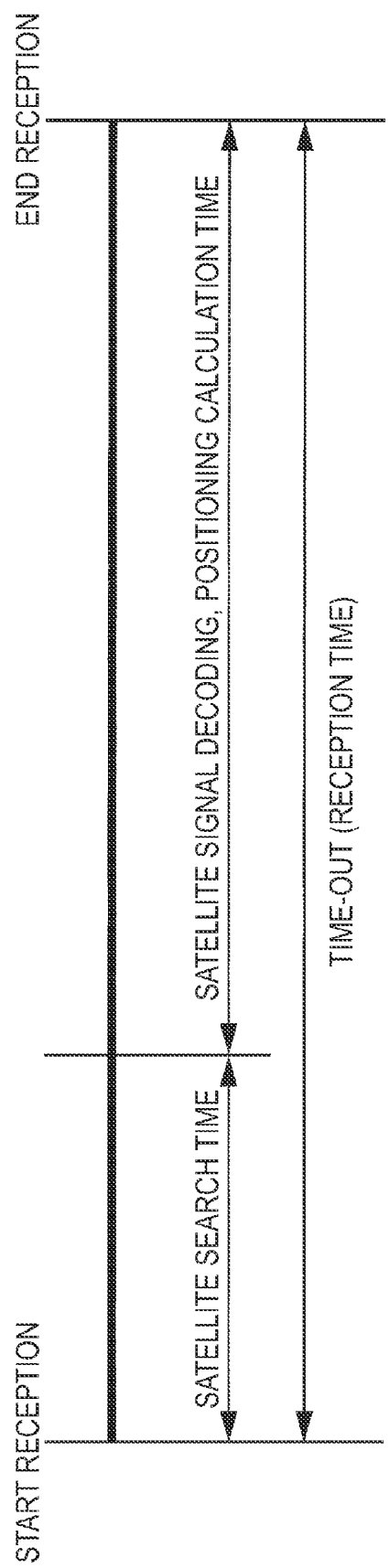
FIG. 10 shows the time-out time.

As shown in FIG. 10, the time-out time is set as the time from when reception starts to when reception ends. In this embodiment of the invention the time-out time in the time mode is set to 30 seconds, and the time-out time in the positioning mode is set to 180 seconds.

Therefore, S13 returns Yes if the information acquisition time, which is the sum of the satellite search time plus the time used to decode the satellite signal and acquire the satellite information, is within the time-out time (30 seconds) in the time mode, but S13 returns No if the information acquisition time exceeds the time-out time (30 seconds).

The time adjustment component 410 then compares the GPS time information acquired from the reception module 30 with the internal time information stored in the storage unit 41, and determines if the difference is within a preset comparison error (tolerance range) (S15). This comparison error is set, for example, to 1 minute, but may be set according to the required accuracy or reception interval, for example.

If S15 returns No, that is, the difference between the GPS time information and the internal time information is greater than the allowed error, it is possible that the correct GPS time information could not be received and the time adjustment component 410 therefore ends the process without adjusting the time.

However, if S15 returns Yes, the correct GPS time information is determined to have been received, the time adjustment component 410 adjusts the internal time information stored in the storage unit 41 based on the GPS time information acquired from the reception module 30, and controls the drive circuit 44 to adjust the displayed time based on the corrected internal time information (S16).

Positioning Mode (Time Adjustment Process)

If the captured satellite count is 3 or more in S3, the reception mode selection component 402 selects the positioning mode and the positioning process component 404 of the reception control component 400 executes the reception process in the positioning mode (S21).

When the positioning mode is selected, the positioning process component 404 starts acquiring the satellite information (particularly the GPS time information and orbit information) of the captured GPS satellites 10 (step S22). More specifically, the baseband unit 60 demodulates the navigation messages from each of the captured GPS satellites and acquires the Z count data and ephemeris data (orbit information). The baseband unit 60 then saves the acquired GPS time information and orbit information in SRAM 63.

The baseband unit 60 then selects a group of N (such as 4) GPS satellites 10 from among the captured GPS satellites 10, and starts the positioning calculation (S23).

More specifically, the baseband unit 60 reads the satellite information (GPS time information and orbit information) for the selected N (such as 4) GPS satellites 10 from SRAM 63, calculates the position, and generates the positioning information (the longitude and latitude of the position where the GPS wristwatch 3 is located).

It should be noted that because the time difference is another unknown value that is required in addition to the x, y, z parameters described above to determine the three-dimensional (x, y, z) location of the GPS wristwatch 3, GPS time information and orbit information is required from four or more GPS satellites 10. However, if the altitude z is set to a predetermined specified value (such as the average sea level) and the position is determined only in two dimensions (x, y), the position can be determined using the GPS time information and orbit information from only three GPS satellites 10. The baseband unit 60 therefore calculates the position in two dimensions when the number of captured GPS satellites 10 is 3, and calculates the position in three dimensions when the number of captured satellites is 4 or more.

The positioning process component 404 determines if the process from the start of reception in S1 through the positioning calculation in S23 is completed within the time-out time (180 seconds). More specifically, if the information acquisition time, which is the sum of the satellite search time plus the time used to decode the satellite signal, calculate the position, and acquire the satellite information, is within the time-out time (180 seconds) in the positioning mode as shown in FIG. 10, the positioning process component 404 returns Yes in S24, but the positioning process component 404 returns No in S24 if the positioning calculation is not completed when the time-out time is reached.

The positioning process component 404 then ends reception (S4) if No is returned in S24. For example, if operation times out because the satellite information from three or more GPS satellites 10 could not be demodulated because the reception level of the satellite signals from the GPS satellites 10 is low, the positioning process component 404 ends reception (S4).

However, if S24 returns Yes, the positioning process component 404 causes the reception module 30 to end the reception operation (S25).

In this situation, however, the baseband unit 60 references the time difference information stored in flash memory 66, and acquires the time difference data for the location of the GPS wristwatch 3 based on the received positioning information.

The time adjustment component 410 then acquires the GPS time information and time difference data from the reception module 30, adjusts the internal time information stored in the storage unit 41 based thereon, and controls the drive circuit 44 to adjust the displayed time based on the corrected internal time information (S26).

Effect of the First Embodiment

In this embodiment of the invention the satellite signal search component 401 executes the satellite search process, and the reception mode selection component 402 selects either the time mode or positioning mode according to the number of satellites captured. As a result, by selecting the positioning mode only when the number of captured satellites is 3 or more, the satellite search process can be prevented from continuing until the time-out period ends because the number of positioning information satellites required for the positioning process cannot be captured. Therefore, by selecting the reception mode according to the number of captured satellites, the satellite signal reception process can be executed efficiently and power consumption can be reduced.

Power can therefore be used effectively and the battery life can be extended in a satellite signal reception device such as a GPS wristwatch 3 that is driven with a power supply of limited capacity (battery capacity).

For example, when the GPS wristwatch 3 is inside a building 5 as shown in FIG. 5, the number of GPS satellites 10 that can be captured varies from 1 to 4 depending upon what time the signals are received as shown in FIG. 3. Because this embodiment of the invention selects the best reception mode according to the number of GPS satellites 10 captured in this situation, satellite signals can be received without wasteful power consumption.

Furthermore, by automatically selecting the reception mode according to the number of GPS satellites 10 captured when the GPS wristwatch 3 is used outdoors, the satellite signals can be received efficiently. For example, the reception process can be executed efficiently by automatically selecting the reception mode so that reception is in the positioning mode when three or more GPS satellites 10 are captured because the signals were received in a location with wide access to the sky, and reception is in the time mode when only 1 or 2 GPS satellites 10 are captured because the signals were received in a location with limited access to the sky, such as in a corridor between tall buildings.

Yet further, because reception is ended immediately when the captured satellite count is 0, the reception process will not be continued needlessly, power consumption can be reduced, and battery life can be extended.

Furthermore, because the timekeeping process component 403 compares the time information acquired by reception (the "acquired time information") with the internal time information and determines if the difference therebetween is within a preset comparison error, whether or not the acquired time information is correct can be confirmed. The internal time information can therefore be adjusted to the correct time when the time adjustment component 410 adjusts the time.

This embodiment of the invention also repeats the satellite search a preset specific number of times in the satellite search step. As a result of the satellite search process repeating plural times, the possibility of being able to capture the GPS satellites 10 can be increased even when a GPS satellite 10 cannot be momentarily captured because a building, for example, is between the GPS wristwatch 3 and the GPS satellites 10.

In addition, because the satellite search does not repeat more than the specified number of times, the search process does not repeat needlessly and power consumption can be reduced when in an environment in which a GPS satellite 10 cannot be captured.

Yet further, because the reception mode is indicated by the second hand, the user can know the reception mode in which information is currently displayed, and user convenience can be improved.

Embodiment 2

A second embodiment of the invention is described next. Note that the configuration of the GPS wristwatch 3 according to the second embodiment of the invention is the same as described in the first embodiment, and further description thereof is thus omitted.

Reception Modes in the Second Embodiment

The reception mode is controlled according to the captured satellite count as shown in Table 1 in a GPS wristwatch 3 according to the second embodiment of the invention.

TABLE 1

| Number of satellites | Reception mode | Time-out (from start to end of reception) |
| --- | --- | --- |
| 0 | End with search | |
| 1 | Time mode (compare with internal clock) | 30 s |
| 2 | Time mode (compare times of 2 satellites) | 30 s |
| 3 | Positioning mode (2D position) | 180 s |
| 4≦ | Positioning mode (3D position) | 180 s |

More specifically, as shown in Table 1, when the captured satellite count is 0, operation ends with the satellite search process.

When the captured satellite count is 1, the time mode is selected and the acquired time information is compared with the internal time information (internal clock) as in the first embodiment.

If the captured satellite count is 2, the time mode is selected and the time information acquired from the two satellites is compared with each other to verify if the acquired time information is correct.

If the captured satellite count is 3, the positioning mode is selected and a two-dimensional positioning process is executed.

If the captured satellite count is 4 or more, the positioning mode is selected and a three-dimensional positioning process is executed.

The time-out time in the time mode is 30 seconds, and the time-out time in the positioning mode is 180 seconds.

The reception processes of the second embodiment shown in Table 1 are described next with reference to the flow charts in FIG. 11 to FIG. 13.

Figure 11:
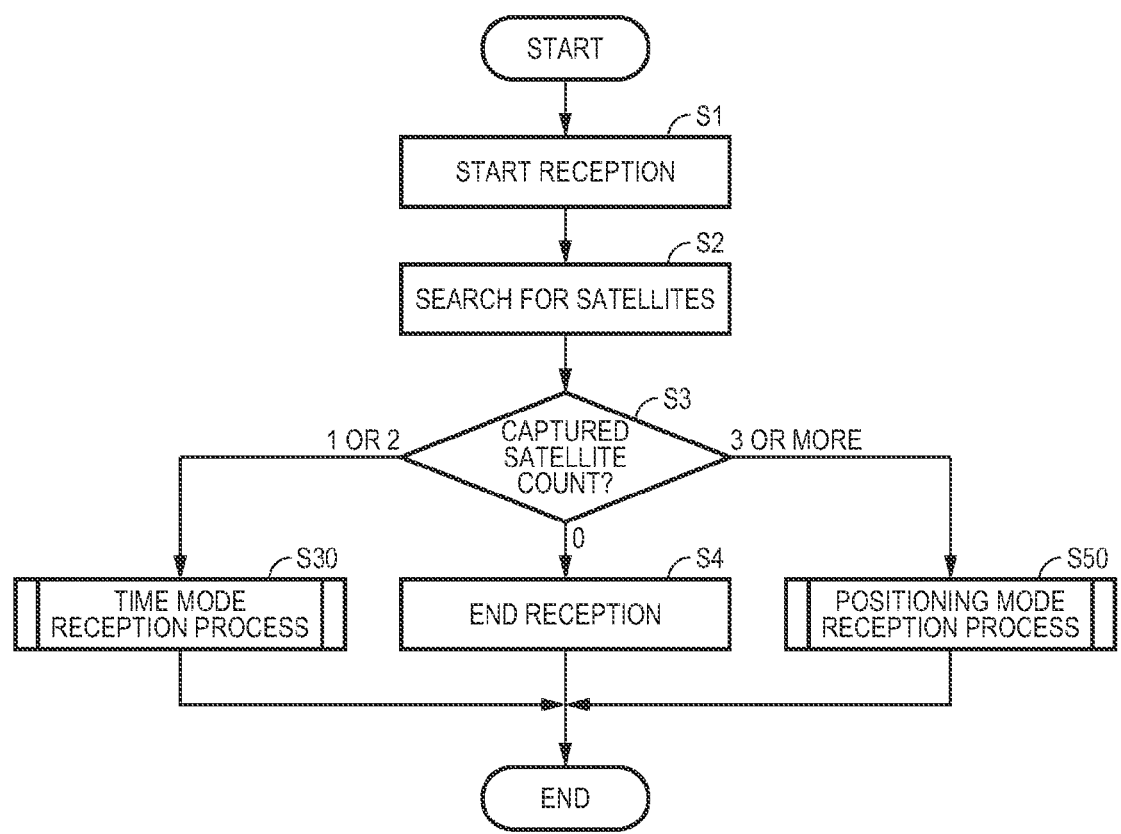
FIG. 11 is a flow chart showing the reception process in a second embodiment of the invention.

As in the first embodiment and shown in FIG. 11, when the control unit 40 of the GPS wristwatch 3 starts reception by the reception control component 400 (S1), The satellite signal search component 401 executes the satellite search process (S2).

If the captured satellite count is 0, reception ends (S4).

If the captured satellite count is 1 or 2, the reception mode selection component 402 selects the time mode and executes the time mode reception process S30.

If the captured satellite count is 3 or more, the reception mode selection component 402 selects the positioning mode and executes the positioning mode reception process S50.

Time Mode

Figure 12:
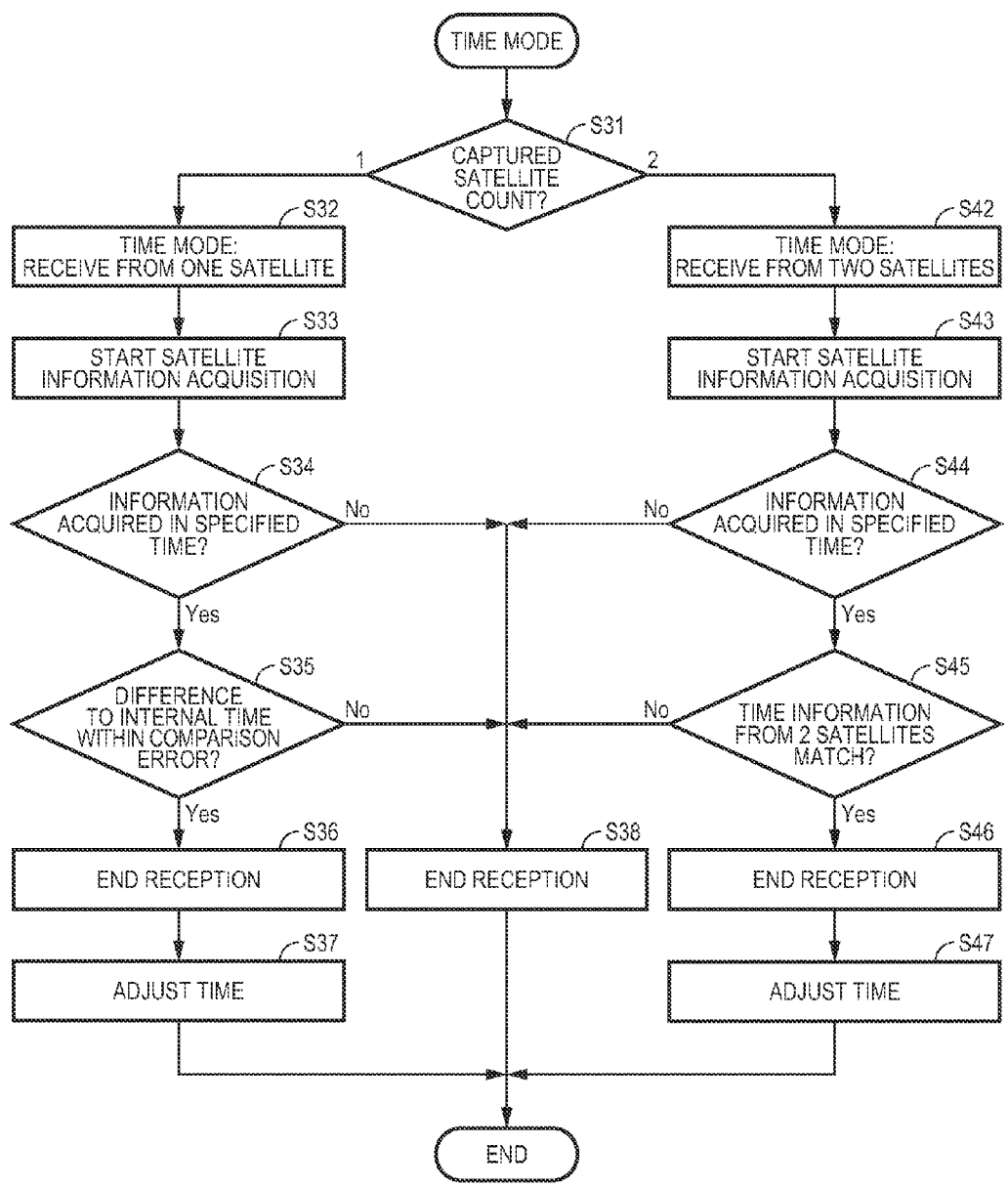
FIG. 12 is a flow chart showing the steps in the time mode in the second embodiment of the invention.

If the time mode is selected, the timekeeping process component 403 determines if the captured satellite count is 1 or 2 (S31) as shown in FIG. 12.

Time Mode, 1-satellite Reception

If the captured satellite count is determined to be 1 in S31, the same process as described in the first embodiment executes. More specifically, the timekeeping process component 403 selects the 1-satellite reception time mode (S32). The timekeeping process component 403 then starts acquiring the satellite information (particularly the GPS time information) of the one captured GPS satellite 10 (S33), and determines if the satellite information was successfully acquired in a specified time (the time-out time) (S34). If S34 returns No, reception ends (S38).

However, if S34 returns Yes, the timekeeping process component 403 compares the GPS time information acquired from the reception module 30 with the internal time information stored in the storage unit 41, and determines if the difference is within a preset comparison error (tolerance range) (S35). If S35 returns No, reception ends (S38).

If S35 returns Yes, the timekeeping process component 403 ends reception (S36), and the time adjustment component 410 adjusts the internal time according to the acquired GPS time information (S37).

Time Mode, 2-satellite Reception

If the captured satellite count is determined to be 2 in S31, the timekeeping process component 403 selects the 2-satellite reception time mode (S42). The timekeeping process component 403 then starts acquiring the satellite information (particularly the GPS time information) of the two captured GPS satellites 10 (S43), and determines if the satellite information was successfully acquired in a specified time (the time-out time) (S44). If S44 returns No, reception ends (S38).

However, if S44 returns Yes, the timekeeping process component 403 compares the GPS time information acquired from the two GPS satellites 10, and determines if they are the same (S45). If S45 returns No, reception ends (S38).

If S45 returns Yes, the timekeeping process component 403 ends reception (S46), and the time adjustment component 410 adjusts the internal time according to the acquired GPS time information (S47).

Positioning Mode

Figure 13:
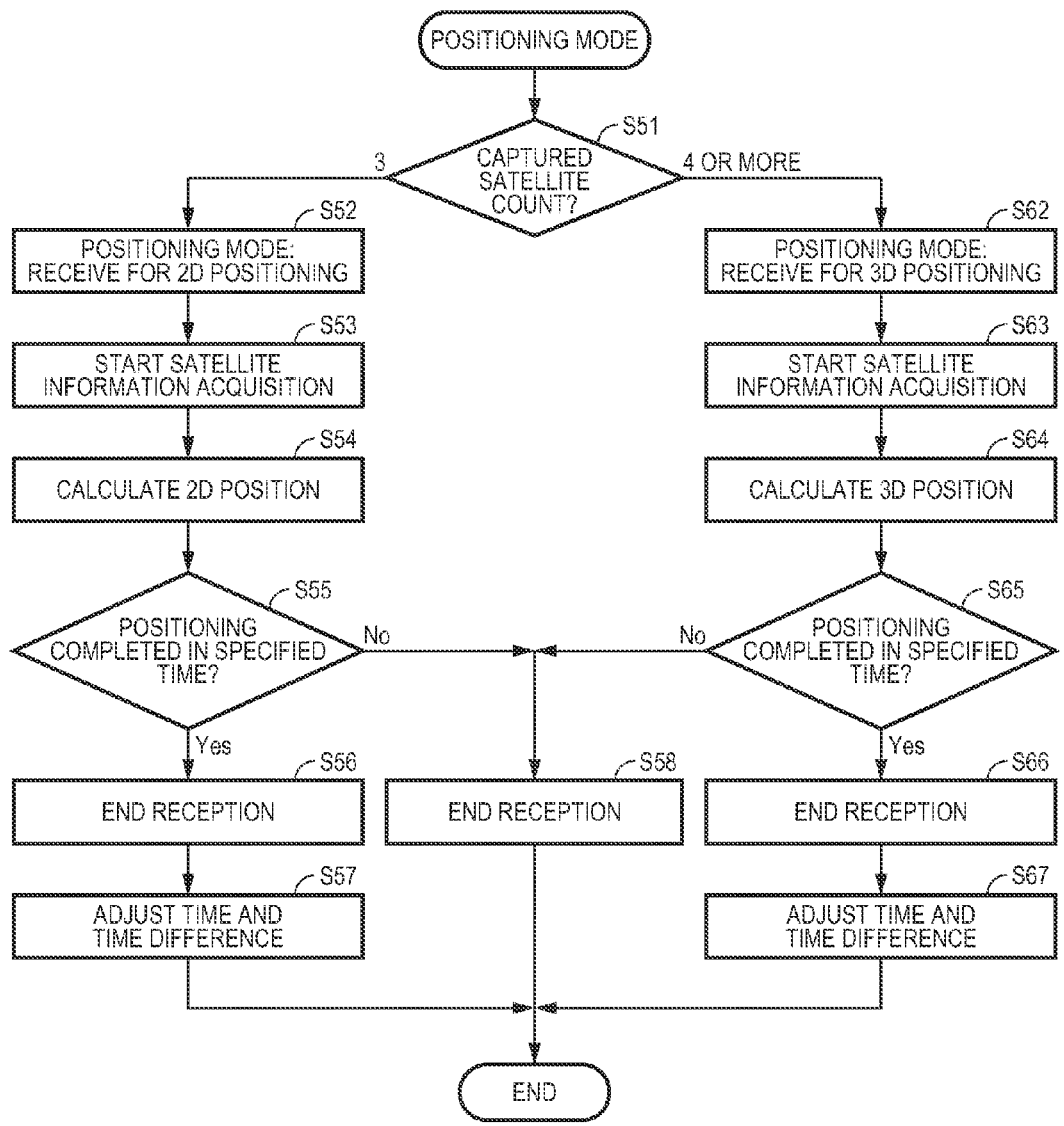
FIG. 13 is a flow chart showing the steps in the positioning mode in the second embodiment of the invention.

If the captured satellite count is 3 or more in S3, the reception mode selection component 402 selects the positioning mode, and the positioning process component 404 determines if the captured satellite count is 3 or 4 or more (S51) as shown in FIG. 13.

Positioning Mode, 2D Positioning

If in S51 the captured satellite count is determined to be 3, the positioning process component 404 selects the 2D positioning reception positioning mode (S52).

The positioning process component 404 then starts acquiring the satellite information (particularly the GPS time information and orbit information) of the captured GPS satellites 10 (S53).

The baseband unit 60 then selects a group of three of the captured GPS satellites 10, and starts the 2D positioning calculation (S54).

The positioning process component 404 then determines if operation through the positioning calculation process is completed and the position was determined within the time-out time (180 seconds) (S55). If the positioning process is not completed within the time-out time (S55 returns No), reception ends (S58).

However, if the positioning process is completed within the time-out time (S55 returns Yes), the positioning process component 404 causes the reception module 30 to end the reception operation (S56).

In this situation, however, the baseband unit 60 references the time difference information stored in flash memory 66, and acquires the time difference data for the location of the GPS wristwatch 3 based on the received positioning information.

The time adjustment component 410 then acquires the GPS time information and time difference data from the reception module 30, adjusts the internal time information stored in the storage unit 41 based thereon, and controls the drive circuit 44 to adjust the displayed time based on the corrected internal time information (S57).

Positioning Mode, 3D Positioning

If in S51 the captured satellite count is determined to be 4 or more, the positioning process component 404 selects the 3D positioning reception positioning mode (S62).

The positioning process component 404 then starts acquiring the satellite information (particularly the GPS time information and orbit information) of the captured GPS satellites 10 (S63).

The baseband unit 60 then selects a group of four of the captured GPS satellites 10, and starts the 3D positioning calculation (S64).

The positioning process component 404 then determines if operation through the positioning calculation process is completed and the position was determined within the time-out time (180 seconds) (S65). If the positioning process is not completed within the time-out time (S65 returns No), reception ends (S58).

However, if the positioning process is completed within the time-out time (S65 returns Yes), the positioning process component 404 causes the reception module 30 to end the reception operation (S66).

In this situation, however, the baseband unit 60 references the time difference information stored in flash memory 66, and acquires the time difference data for the location of the GPS wristwatch 3 based on the received positioning information.

The time adjustment component 410 then acquires the GPS time information and time difference data from the reception module 30, adjusts the internal time information stored in the storage unit 41 based thereon, and controls the drive circuit 44 to adjust the displayed time based on the corrected internal time information (S67).

The reception mode is also indicated by the second hand in this second embodiment of the invention.

More specifically, in the 1-satellite time mode the second hand moves to the 1-second position during reception and when displaying if reception was successful.

In the 2-satellite time mode the second hand moves to the 2-second position during reception and when displaying if reception was successful.

In the 3-satellite positioning mode (2D positioning) the second hand moves to the 3-second position during reception and when displaying if reception was successful.

In the 4-satellite positioning mode (3D positioning) the second hand moves to the 4-second position during reception and when displaying if reception was successful.

If no satellites are captured or if reception fails, the second hand moves to the 20-second position.

This second embodiment of the invention achieves the same effects as the first embodiment.

In addition, because the timekeeping process component 403 that processes the time mode changes the executed process when the captured satellite count is 1 and when the count is 2, reception can be controlled optimally according to the number of captured satellites. More specifically, because two GPS time values are compared with each other when two satellites are captured and the time is adjusted when the values are the same, whether the acquired GPS time information is correct or not can be verified more reliably, and the internal time information can be adjusted to the correct time.

Likewise, because the positioning process component 404 that processes the positioning mode calculates the location in two dimensions when the captured satellite count is 3, and calculates the location in three dimensions when the captured satellite count is 4 or more, the best positioning mode can be used according to the number of captured satellites.

It will be obvious to one with ordinary skill in the related art that the invention is not limited to the embodiments described above, and can be varied in many ways without departing from the scope of the accompanying claims.

For example, the foregoing embodiments repeat the satellite search process a specific number of times in the satellite search step, but the satellite search process may be executed for a specific period of time instead.

The satellite search process may also be executed only once.

In addition, the reception process is executed when the A button 15 is pressed for a predetermined time in each of the foregoing embodiments, but a configuration in which the time mode is selected when the A button 15 is pressed for a specified time, and the positioning mode is selected when the B button 16 is pressed for a specified time, is also conceivable. In addition, when the positioning mode is manually selected, the reception mode can be automatically selected based on the captured satellite count as described in the foregoing embodiments.

The foregoing embodiments are described with reference to a GPS satellite as an example of a positioning information satellite, but the positioning information satellite of the invention is not limited to GPS satellites and the invention can be used with Global Navigation Satellite Systems (GNSS) such as Galileo (EU), GLONASS (Russia), and Beidou (China), and other positioning information satellites that transmit satellite signals containing time information, including the SBAS and other geostationary or quasi-zenith satellites.

The satellite signal reception device of the invention is also not limited to analog timepieces having hands, and can be used with combination timepieces having both analog hands and a digital display, as well as digital timepieces having only a digital display.

The invention is also not limited to wristwatches, and may be applied to pocket watches and other types of timepieces, cell phones, digital cameras, and other types of portable information terminals.

Although the present invention has been described in connection with preferred embodiments thereof with reference to the accompanying drawings, it is to be noted that various changes and modifications will be apparent to those skilled in the art. Any such changes or modifications are intended to be included within the scope of the present invention to the extent embraced by any of the claims of this application.

What is claimed is:

1. A satellite signal reception device, comprising:
a reception unit that receives a satellite signal transmitted from a positioning information satellite; and
a reception control component that controls the reception unit to execute a reception process, and includes
a satellite signal search component that searches for the satellite signal by means of the reception unit,
a reception mode selection component that selects either a time mode or a positioning mode according to the number of satellites from which a satellite signal was captured by the satellite signal search component,
a positioning process component that executes a positioning process of receiving the satellite signals and acquiring positioning information by means of the reception unit when the reception mode selection component selects the positioning mode, and
a timekeeping process component that executes a timekeeping process of receiving the satellite signals and acquiring time information by means of the reception unit when the reception mode selection component selects the time mode
a timekeeping component that keeps time information; and
a time adjustment component that adjusts the internal time information of the timekeeping component according to time information acquired by receiving the satellite signal, compares the acquired time information acquired from the satellite signal with the internal time information kept by the timekeeping component when the number of satellites captured by the satellite signal search component is 1, and corrects the internal time information according to the acquired time information when the difference between said time information is within a preset range, and compares the two acquired time information values acquired from the satellite signals when the number of satellites captured by the satellite signal search component is 2, and corrects the internal time information according to the acquired time information when said two values match.

2. The satellite signal reception device described in claim 1, wherein:
the reception mode selection component selects the time mode when the number of satellites captured by the satellite signal search component is 1 or 2, and selects the positioning mode when the number of captured satellites is 3 or more.

3. The satellite signal reception device described in claim 1, wherein:
the positioning process component executes a positioning calculation based on three satellite signals when the number of satellites captured by the satellite signal search component is 3, and executes a positioning calculation based on four satellite signals when the number of satellites captured by the satellite signal search component is 4.

4. The satellite signal reception device described in claim 1, wherein:
the satellite signal search component captures satellites from which the signal level of the received satellite signal is greater than or equal to a specified value.

5. The satellite signal reception device described in claim 1, wherein:
the satellite signal search component stops the reception process of the reception unit when even one satellite cannot be captured.

6. The satellite signal reception device described in claim 1, wherein:
the satellite signal search component repeats a satellite search process that searches sequentially for each satellite a specified number of times to capture satellites.

7. The satellite signal reception device described in claim 1, wherein:
the satellite signal search component repeats a satellite search process that searches sequentially for each satellite for a specified time to capture satellites.

8. The satellite signal reception device described in claim 1, further comprising:
a display that displays the currently selected reception mode.

9. A control method for a satellite signal reception device that has a reception unit that receives a satellite signal transmitted from a positioning information satellite, the control method comprising:
searching for the satellite signal by means of the reception unit;
selecting either a time mode or a positioning mode according to the number of satellites from which a satellite signal was captured in the satellite signal search step;
executing a positioning process of receiving the satellite signals and acquiring positioning information by means of the reception unit when the mode selection step selects the positioning mode, wherein if the number of satellites from which a signal is captured is 3, further executing a positioning calculation based on the three captured satellite signals, and if the number of satellites from which a signal is captured is 4, further executing a positioning calculation based on the four captured satellite signals; and
executing a timekeeping process of receiving the satellite signals and acquiring time information by means of the reception unit when the mode selection step selects the time mode.

* * * * *